(12) United States Patent
Kavan

(10) Patent No.: US 9,245,379 B2
(45) Date of Patent: Jan. 26, 2016

(54) CONTINUUM BASED MODEL FOR POSITION BASED DYNAMICS

(75) Inventor: Ladislav Kavan, Salt Lake City, UT (US)

(73) Assignee: Disney Enterprises, Inc., Burbank, CA (US)

(*) Notice: Subject to any disclaimer, the term of this patent is extended or adjusted under 35 U.S.C. 154(b) by 669 days.

(21) Appl. No.: 13/276,644

(22) Filed: Oct. 19, 2011

(65) Prior Publication Data

US 2013/0103358 A1    Apr. 25, 2013

(51) Int. Cl.
*G06F 7/60* (2006.01)
*G06F 17/10* (2006.01)
*G06T 17/00* (2006.01)

(52) U.S. Cl.
CPC .............. *G06T 17/00* (2013.01); *G06F 2217/32* (2013.01); *G06T 2210/16* (2013.01)

(58) Field of Classification Search
CPC .......................... G06T 17/5018; G06T 17/50
USPC ............................................................ 703/2
See application file for complete search history.

(56) References Cited

U.S. PATENT DOCUMENTS

| | | | | |
|---|---|---|---|---|
| 6,968,297 | B1* | 11/2005 | Ziakovic et al. | 703/1 |
| 7,408,550 | B2* | 8/2008 | Bunnell | 345/426 |
| 8,327,388 | B2* | 12/2012 | Muller et al. | 719/328 |
| 2014/0002463 | A1* | 1/2014 | Kautzman et al. | 345/473 |

OTHER PUBLICATIONS

Goldenthal, R., Harmon, D., Fattal, R., Bercovier, M., & Grinspun, E. (Aug. 2007). Efficient simulation of inextensible cloth. In ACM Transactions on Graphics (TOG) (vol. 26, No. 3, p. 49). ACM.*
Thomaszewski, B., Pabst, S., & Straβer, W. (Apr. 2009). Continuum-based Strain Limiting. In Computer Graphics Forum (vol. 28, No. 2, pp. 569-576). Blackwell Publishing Ltd.*
Volino, P., Magnenat-Thalmann, N., & Faure, F. (2009). A simple approach to nonlinear tensile stiffness for accurate cloth simulation. ACM Transactions on Graphics, 28(4), Article-No.*

* cited by examiner

*Primary Examiner* — Aniss Chad
(74) *Attorney, Agent, or Firm* — Patterson + Sheridan, LLP

(57) ABSTRACT

A technique for position based dynamics constrains deformation of triangles within a simulation mesh configured to model a cloth object. The constraints comprise at least a weft, warp, and shear constraint per triangle within the simulation mesh. A non-rigid shear constraint yields realistic cloth dynamics while avoiding locking within the simulation mesh. The technique may be implemented in real-time or batch simulation environments.

20 Claims, 4 Drawing Sheets

CONTINUUM BASED MODEL FOR POSITION BASED DYNAMICS

BACKGROUND

1. Field of the Invention

The present invention relates to the field of computer graphics and, in particular, to techniques for a continuum based model for position based dynamics.

2. Description of the Related Art

Improving realism is a key factor driving development of new generations of computer graphics systems. Tremendous strides have been made improving realism with respect to lighting, surface features and texture, and dynamics for rigid objects. Progress has also been made in simulating dynamics of soft objects, such as thin cloth objects in a range of different environments. Highly realistic cloth simulation can produce visually appealing animation, and contribute a high degree of overall realism to a graphics scene. However, simulating the dynamics of cloth objects has conventionally been challenged by locking and convergence problems.

One class of conventional simulator for object dynamics implements techniques based on integration of force and mass over time to indirectly compute updated position information. For example, a mesh of vertices defines a surface for a soft object. Each vertex within the mesh comprises a particle with attributes of mass and position. Velocity for a given vertex may be computed by integrating the effective acceleration for the vertex due to an applied force. A distance constraint may be established between vertices to maintain an appropriate physical structure for the mesh. During simulation, a new position for each vertex within the mesh is computed via time integration, while adhering to physical constraints, such as one or more distance constraints. If a physical constraint is violated, then additional iterations for each vertex may be executed to attempt to converge on a valid solution. A given mesh may not easily converge or it may converge into a physically meaningless configuration and become "locked" in the configuration. Both scenarios degrade the quality of simulator results and oftentimes require intervention from a user.

Another class of conventional simulator for object dynamics implements position based dynamics (PBD) rather than force-based time integration simulation. The central theme of PBD is to use constraints to directly update vertex position, instead of calculating forces that indirectly influence position via time integration. In cloth simulation, the most important constraints are distance constraints, because they prevent a simulation mesh from falling apart. One distance constraint is conventionally established per edge within the mesh. A PBD solver performs a sequence of time steps to solve for evolving position state information of vertices within the mesh. A typical PBD time step involves a set of simulation steps that iteratively project all of distance constraints within the mesh. Typically, one simulation step involves several constraint projection steps that each solves an approximation of a distance constraint. The mesh is commonly represented as a collection of triangles. Unfortunately, a triangle with three distance constraints along its edges does not allow for any internal deformation, leading to a high propensity of meshes locking during simulation. One solution to locking in PBD simulators is to implement non-rigid distance constraints. Greater slack in the non-rigid distance constraints for a mesh leads to a greater likelihood that the PBD solver will converge without locking. Unfortunately, increasing slack in the distance constraints makes the mesh appear to be stretchy. Unless a cloth being modeled by the mesh is supposed to be stretchy, this is a highly undesirable outcome.

As the foregoing illustrates, what is needed in the art is an efficient technique for simulating object dynamics that avoids locking.

SUMMARY

One embodiment of the present invention sets forth a computer-implemented method, comprising generating triangle information representative of a triangle within a simulation mesh that is being simulated within a computing device, wherein the triangle information includes at least position data for each vertex associated with the triangle, and projecting a set of constraints on the triangle, wherein the set of constraints includes a shear constraint associated with the triangle.

Other embodiments of the present invention include, without limitation, a computer-readable storage medium including instructions that, when executed by a processing unit, cause the processing unit to perform the techniques described herein.

One advantage of embodiments of the present invention is that a position based dynamics simulator may be configured to generate fabric dynamics having improved realism, while avoiding locking in associated simulation meshes.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Embodiments of the present invention implement a continuum based model for position based dynamics (PBD) simulation. A simulation mesh comprising a plurality of triangles is specified as having a warp direction and a weft direction. Each triangle of the plurality of triangles is configured to include three continuum-based constraints: weft stretch, warp stretch, and weft-warp shear. Gradients for each of these constraints can be computed analytically and are easy to solve for in-plane elasticity.

System Overview

Figure 1:
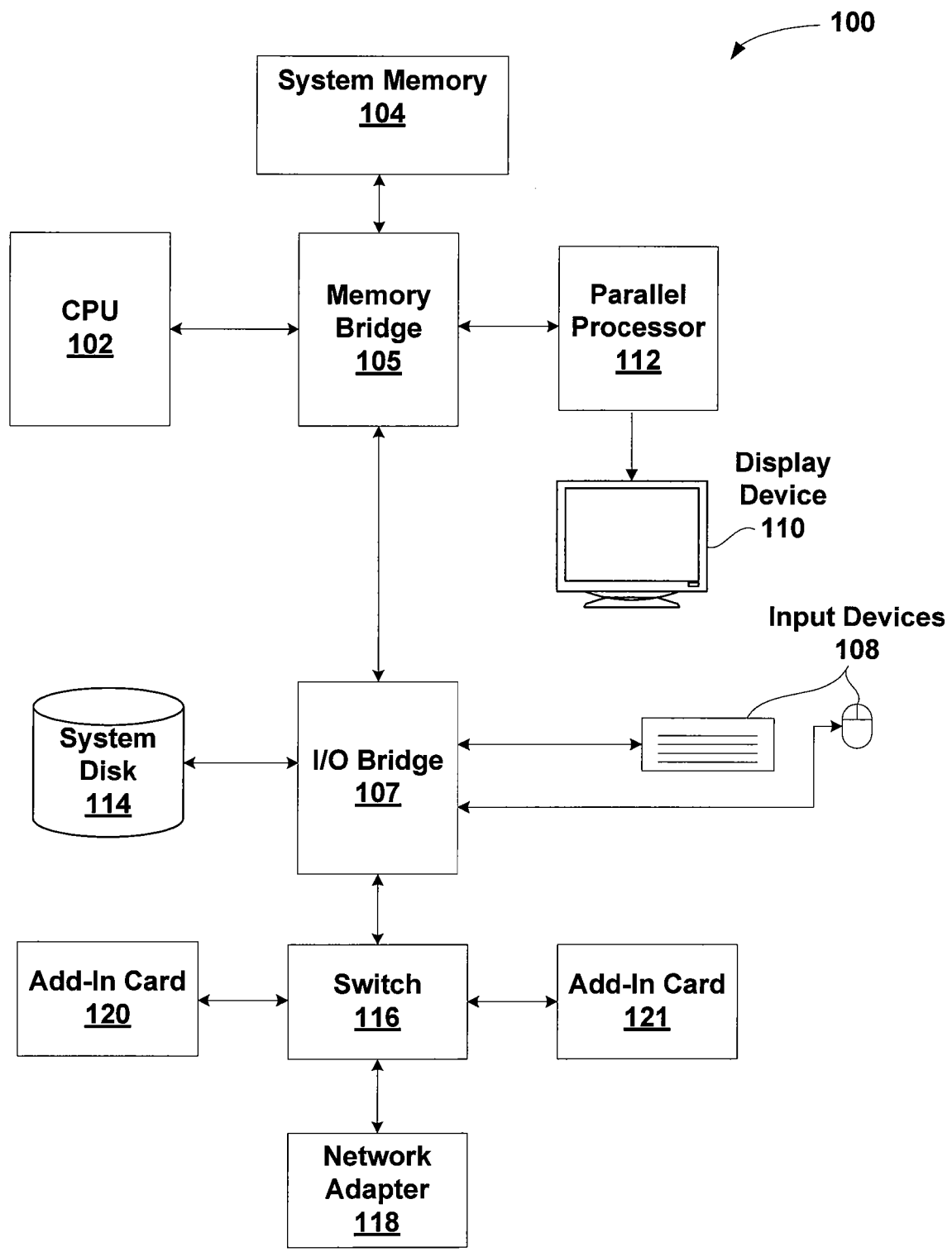
FIG. 1 is a block diagram of a system configured to implement one or more aspects of the present invention.

FIG. 1 is a block diagram of a system 100 configured to implement one or more aspects of the present invention.

System 100 may be a computer workstation, personal computer, video game console, personal digital assistant, rendering engine, mobile phone, or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Continuum Model for Position Based Dynamics

Embodiments of the present invention implement a continuum based model for position based dynamics (PBD) simulation. A simulation mesh comprising a plurality of triangles is specified as having a warp direction and a weft direction. Each triangle of the plurality of triangles is configured to include three continuum-based constraints: weft stretch, warp stretch, and weft-warp shear. Gradients for each of these constraints can be computed analytically and are easy to solve for in-plane elasticity. During the course of simulating position state for the simulation mesh at a given time step, one or more constraints may be violated, requiring a correction of the violated constraints. In prior art simulation systems, simple distance constraints can lead to locking in the simulation mesh. By contrast, embodiments of the present invention implement continuum-based constraints that avoid locking.

Figure 2:
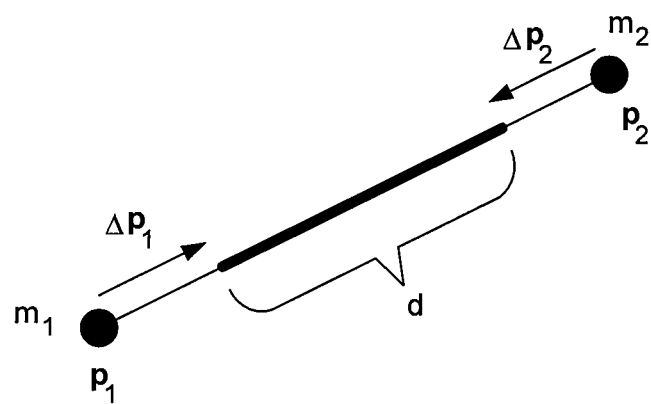
FIG. 2 illustrates a distance constraint between two vertices, according to one embodiment of the present invention.

FIG. 2 illustrates a distance constraint between two vertices (points) $p_1$, $p_2$ according to one embodiment of the present invention. The vertices $p_1$, $p_2$ have corresponding masses m1, m2. A projection operation displaces each vertex $p_1$, $p_2$ by $\Delta p$ along a corresponding triangle edge. The projection operation comprises moving the vertices to new locations, such that the new locations satisfy the distance constraint, illustrated as distance d. Given a vertex p, a displacement $\Delta p$ may be computed along $\nabla_p C$ (along a connecting triangle edge). The displacement "corrects" the position of a corresponding vertex and is also referred to as a correction.

Displacement values for each of the vertices along an edge need not be identical. Masses m1, m2 associated with vertices $p_1$, $p_2$ may be accounted for when computing corresponding displacement values $\Delta p1$, $\Delta p2$ for the vertices. For example displacement values may be weighted according to the inverse of a mass (w=1/m) for a corresponding vertex. The distance constraint between the two vertices $p_1, p_2 \in \mathbb{R}^3$, with a rest pose length of $d \in \mathbb{R}$ is specified as Equation 1, below.

$$C(p_1,p_2)=\|p_1-p_2\|-d \quad (Eq. 1)$$

A PBD solver computes updated positions for each vertex within the simulation mesh, based on constraints specified for each pair of vertices. The PBD solver iteratively projects all of the constraints; typically in one simulation step several constraint projection steps are executed. Each projection step solves a particular constraint, such as $C(p_1,p_2)=0$, based on Equation 1. This constraint may be approximated by linearizing the constraint at the current state. This requires constraint gradients $\nabla p_1 C(p_1,p_2)$ and $\nabla p_2 C(p_1,p_2)$. For the distance constraint from Equation 1, the gradients are simply n and −n, respectively, where $$n = \frac{p_1 - p_2}{\|p_1 - p_2\|}.$$

The distance constraint of Equation 1 provides a simple example of a constraint. However, this simple distance constraint yields triangles with rigid edges and does not allow for any internal deformation, leading to a high propensity of meshes locking during simulation.

A superior constraint regime to the basic distance constraint is based on the observation that common fabrics typically resist stretching, but are relatively permissive in shearing motions. Consequently, permitting individual triangles to shear to a controlled extent yields realistic fabric dynamics while avoiding locking problems. A simple continuum based model for in-plane constraints is implemented that separates stretching and shearing modes. As described below in FIGS. 3A-3B, constraints for this continuum model are easy to implement.

Figure 3A:
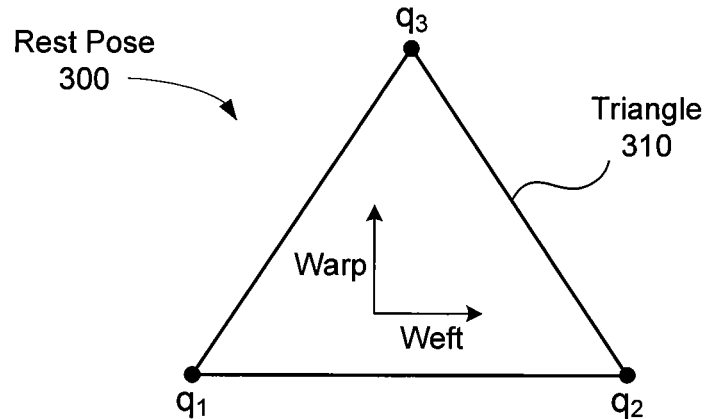
FIG. 3A illustrates a triangle in a rest pose, according to one embodiment of the present invention.

FIG. 3A illustrates a triangle 310 in a rest pose 300, according to one embodiment of the present invention. The triangle 310 includes three vertices at positions $q_1, q_2, q_3 \in \mathbb{R}^3$ as well as a weft direction specified by $\alpha_1, \alpha_2, \alpha_3 \in \mathbb{R}$, and a warp direction specified by $\beta_1, \beta_2, \beta_3 \in \mathbb{R}$, such that $\Sigma_i \alpha_i = \Sigma_i \beta_i = 0$. The rest pose weft vector is given by $\alpha_1 q_1 + \alpha_2 q_2 + \alpha_3 q_3$ and the rest pose warp vector is given by $\beta_1 q_1 + \beta_2 q_2 + \beta_3 q_3$. The rest pose weft vector and rest pose warp vector are orthogonal and unit length.

Figure 3B:
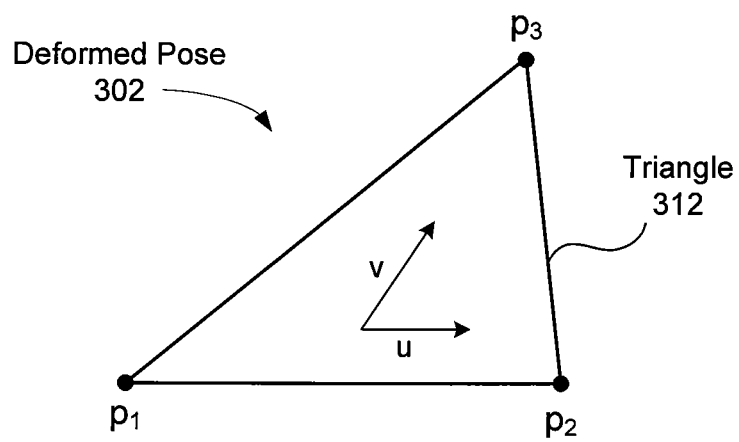
FIG. 3B illustrates a triangle in a deformed pose, according to one embodiment of the present invention.

FIG. 3B illustrates a triangle 312 in a deformed pose 302, according to one embodiment of the present invention. During simulation, the triangle 310 of FIG. 3A is deformed to generated the triangle 312. A given state for triangle 312 may result from plural, sequential deformation steps. The triangle 312 includes three vertices at positions $p_1, p_2, p_3 \in \mathbb{R}^3$ as well as current (deformed) weft vector $u \in \mathbb{R}^3$ and current warp vector $v \in \mathbb{R}^3$. The current weft vector may be computed as $u = \alpha_1 p_1 + \alpha_2 p_2 + \alpha_3 p_3$, and the current warp vector may be computed as $v = \beta_1 p_1 + \beta_2 p_2 + \beta_3 p_3$. In the deformed pose 302, the weft and warp vectors are no longer unit length or orthogonal.

The continuum based constraints that specify resistance to stretching are stated in Equations 2-3, below. Resistance to shearing is specified in Equation 4, below. The symbol "T" in Equation 3 indicates a transposition operator, such as a dot product between vectors u and v.

$$C_u(p_1, p_2, p_3) = \|u\| - 1 \quad (Eq. 2)$$
$$= \|\alpha_1 p_1 + \alpha_2 p_2 + \alpha_3 p_3\| - 1$$

$$C_v(p_1, p_2, p_3) = \|v\| - 1 \quad (E2. 3)$$
$$= \|\beta_1 p_1 + \beta_2 p_2 + \beta_3 p_3\| - 1$$

$$C_{uv}(p_1, p_2, p_3) = \frac{u^T v}{\|u\|\|v\|} \quad (Eq. 4)$$

Setting all three constraints to zero and projecting leads to substantially identical results to a standard distance constraint specified in Equation 1, which is prone to locking. However, reducing stiffness of the shearing constraint in Equation 4 produces compliant triangles that yield a better behaved simulation overall. In other words, Equation 4 is solved for $C_{uv} \leq e$, for e>0, rather than for $C_{uv}=0$. The factor e=0 specifies a rigid triangle, while e>0 specifies a triangle that is able to shear.

A gradient is calculated for each constraint by differentiating the constraint with respect to primary variables for the constraint. Equation 5, below, defines a gradient function for Equation 2. Equation 6, below, defines a gradient function for Equation 3. Equation 7, below, defines a gradient function for Equation 4.

$$\nabla p_i C_u(p_1, p_2, p_3) = \alpha_i \frac{u}{\|u\|} \quad (Eq. 5)$$

$$\nabla p_i C_v(p_1, p_2, p_3) = \beta_i \frac{v}{\|v\|} \quad (Eq. 6)$$

$$\nabla p_i C_{uv}(p_1, p_2, p_3) = \frac{1}{\|u\|\|v\|}\left[u\left(\beta_i - \alpha_i \frac{u^T v}{\|u\|^2}\right) + v\left(\alpha_i - \beta_i \frac{u^T v}{\|v\|^2}\right)\right] \quad (Eq. 7)$$

Position updates are computed from the gradients expressed in Equations 5-9. For example, position updates may be computed such that $C(p+\Delta p)=0$, which may be approximated by Equation 8, below.

$$C(+\Delta p) \approx C(p) + \nabla_p C(p) \cdot \Delta p = 0 \quad (Eq. 8)$$

In one embodiment, the three constraints specified in Equations 2-4 are projected for a given triangle simultaneously, making the order of evaluation for individual constraints irrelevant.

Figure 4:
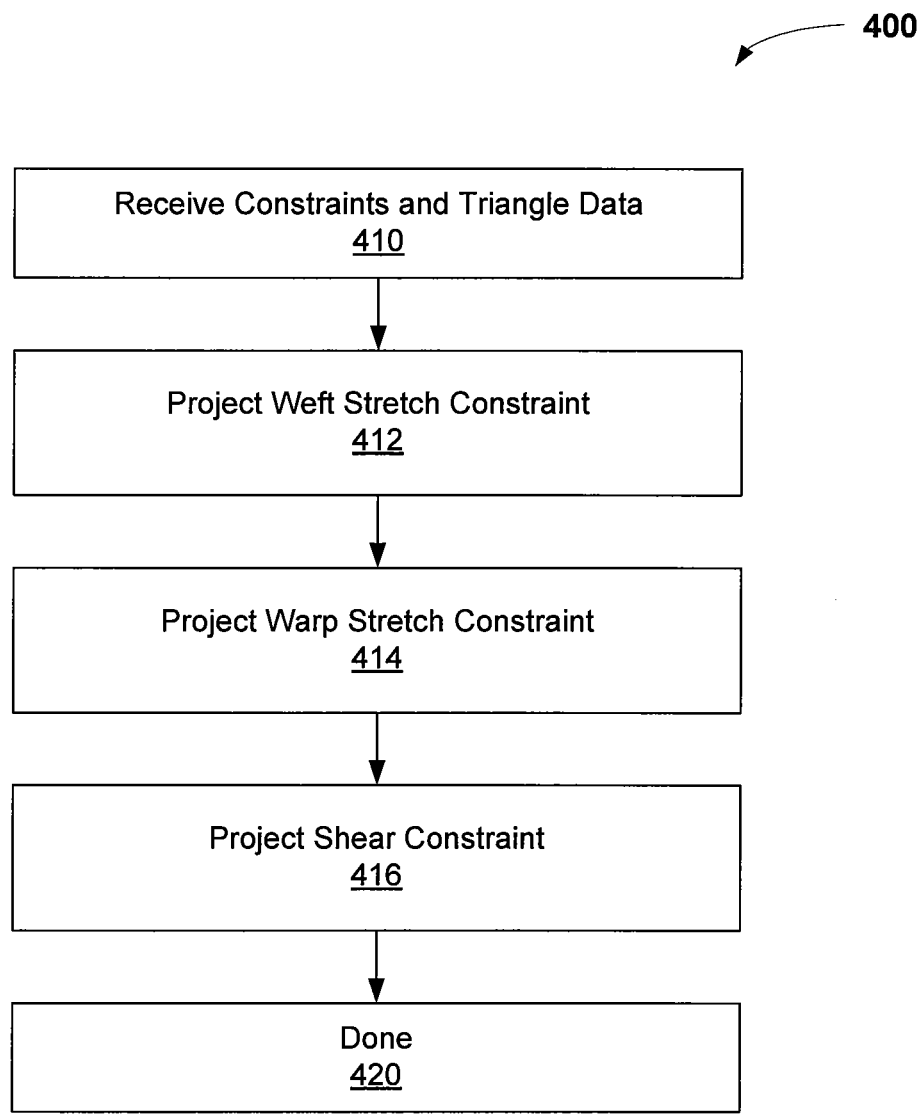
FIG. 4 is a flow diagram of method steps for projecting constraints in a position based dynamics simulation system, according to one embodiment of the present invention.

FIG. 4 is a flow diagram of method steps 400 for projecting constraints in a position based dynamics simulation system, according to one embodiment of the present invention. Although the method steps are described in conjunction with the system of FIG. 1, persons skilled in the art will understand that any system configured to perform the method steps is within the scope of the present invention.

The method begins in step 410, where a projection module within a position based dynamics simulator receives constraint and triangle data. In one embodiment, the constraint data includes, without limitation, a set of three alpha parameters ($\alpha_1$, $\alpha_2$, $\alpha_3$) and a set of three beta parameters ($\beta_1$, $\beta_2$, $\beta_3$). The triangle data includes, without limitation, vertex position data for three vertices ($p_1$, $p_2$, $p_3$) associated with the triangle, and may include a mass value corresponding to each vertex.

In step 412, the projection module performs a projection operation on a weft constraint by solving Equation 8 using the constraint specified in Equation 2 and corresponding gradient specified in Equation 5. In step 414, the projection module performs a projection operation on a warp constraint by solving Equation 8 using the constraint specified in Equation 3 and corresponding gradient specified in Equation 6. In step 416, the projection module performs a projection operation on a shear constraint by solving Equation 8 using the constraint specified in Equation 4 and corresponding gradient specified in Equation 7. The method terminates in step 420.

Persons skilled in the art will recognize that position based dynamics simulators may be implemented for real-time feedback as well as batch mode processing of animation data.

In sum, embodiments of the present invention implement a position based dynamics simulator configured to project constraints comprising weft, warp, and shear for each triangle in a simulation mesh. A non-rigid stiffness in at least the shear constraint is implemented, which provides realistic fabric dynamics while avoiding locking in the simulation mesh.

One advantage of embodiments of the present invention is that a position based dynamics simulator may be configured to generate fabric dynamics having improved realism, while avoiding locking in associated simulation meshes.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method of graphically simulating surface dynamics of a target object, the computer-implemented method comprising:

generating triangle information representative of a triangle within a simulation mesh of a surface of the target object that is being graphically simulated within a computing device, wherein the surface comprises a fabric surface, wherein the triangle information includes at least position data for each vertex associated with the triangle; and generating, using position-based dynamics and without using force-based time integration simulation, a graphical simulation of dynamics of the surface of the target object by operation of one or more computer processors and by projecting, for each triangle within the simulation mesh, a set of continuum-based constraints determined based on weft and warp vector magnitudes of the respective triangle, the set of continuum-based constraints including a shear constraint, a weft constraint, and a warp constraint, wherein the weft constraint is determined based on the weft vector magnitude, wherein the warp constraint is determined based on the warp vector magnitude, wherein the shear constraint is determined based on the weft and warp vector magnitudes and implements non-rigid stiffness in order to facilitate realism in simulated fabric dynamics while avoiding locking in the simulation mesh and without requiring non-rigid distance constraints, thereby avoiding stretch artifacts resulting from applying non-rigid distance constraints, wherein the graphical simulation includes deformation of the surface over time, wherein deformation of the surface over time comprises movement of particles of the surface of the soft object over time, wherein the particles are defined by vertices of the mesh, wherein the graphical simulation is output.

2. The computer-implemented method of claim 1, wherein the shear constraint comprises a quotient between a dot product of: (i) a weft vector and (ii) a warp vector; and a scalar product of: (i) the warp vector magnitude comprising a magnitude for the weft vector and (ii) the warp vector magnitude comprising a magnitude for the warp vector; wherein the target object comprises a soft object.

3. The computer-implemented method of claim 2, wherein the weft constraint comprises a first difference between the magnitude for the weft vector and one; wherein in position-based dynamics, constraints are used to update vertex positions, wherein in force-based time integration simulation, forces are determined that influence position via time integration.

4. The computer-implemented method of claim 3, wherein the weft vector comprises a first vector sum of a first scalar-vector product between a first scalar and a first vertex, a second scalar-vector product between a second scalar and a second vertex, and a third scalar-vector product between a third scalar and a third vertex; wherein the weft constraint comprises a weft-stretch constraint, wherein the warp constraint comprises a warp-stretch constraint, wherein the shear constraint comprises a weft-warp-shear constraint.

5. The computer-implemented method of claim 4, wherein the warp constraint comprises a second difference between the magnitude for the warp vector and one, wherein each of the weft, warp, and shear constraints is simultaneously projected on the triangle, wherein the graphical simulation comprises, in respective instances, a real-time graphical simulation and a batch-mode graphical simulation.

6. The computer-implemented method of claim 5, wherein the warp vector comprises a second vector sum of a fourth scalar-vector product between a fourth scalar and the first vertex, a fifth scalar-vector product between a fifth scalar and the second vertex, and a sixth scalar-vector product between a sixth scalar and the third vertex, wherein the triangle information further includes a mass value corresponding to each vertex of the triangle.

7. The computer-implemented method of claim 6, further comprising:
providing constraint information separate from the triangle information, wherein the constraint information includes a set of three alpha parameters and a set of three beta parameters, wherein the weft, warp, and shear constraints are projected on the triangle based at least in part on the constraint information; and
calculating a gradient for each constraint, including a shear gradient for the shear constraint, a weft gradient for the weft constraint, and a warp gradient for the warp constraint, wherein the gradient of each constraint is calculated by differentiating the respective constraint with respect to primary variables for the respective constraint.

8. The computer-implemented method of claim 7, wherein projecting comprises computing a displacement vector for each vertex of the triangle, based on the weft constraint, the weft gradient, the warp constraint, the warp gradient, the shear constraint, and the shear gradient;
wherein the weft constraint is projected by solving a first predefined equation using a constraint specified in a second predefined equation and further using a corresponding gradient specified in a third predefined equation;
wherein the warp constraint is projected by solving the first predefined equation using a constraint specified in a fourth predefined equation and further using a corresponding gradient specified in a fifth predefined equation;
wherein the shear constraint is projected by solving the first predefined equation using a constraint specified in a sixth equation and further using a corresponding gradient specified in a seventh predefined equation;
wherein each of the first, second, third, fourth, fifth, sixth, and seventh predefined equations are distinct equations.

9. The computer-implemented method of claim 8, wherein each displacement vector is scaled based on a mass associated with a corresponding vertex, wherein the first, second, third, fourth, fifth, sixth and seventh predefined equations are given by, respectively:

$$C(p + \Delta p) \approx C(p) + \nabla_p C(p) \cdot \Delta p = 0$$
$$C_u(p_1, p_2, p_3) = \|u\| - 1 = \|\alpha_1 p_1 + \alpha_2 p_2 + \alpha_3 p_3\| - 1$$
$$\nabla_{p_i} C_u(p_1, p_2, p_3) = \alpha_i \frac{u}{\|u\|}$$
$$C_v(p_1, p_2, p_3) = \|v\| - 1 = \|\beta_1 p_1 + \beta_2 p_2 + \beta_3 p_3\| - 1$$
$$\nabla_{p_i} C_v(p_1, p_2, p_3) = \beta_i \frac{v}{\|v\|}$$
$$C_{uv}(p_1, p_2, p_3) = \frac{u^T v}{\|u\|\|v\|}$$
$$\nabla_{p_i} C_{uv}(p_1, p_2, p_3) = \frac{1}{\|u\|\|v\|} \left[ u \left( \beta_i - \alpha_i \frac{u^T v}{\|u\|^2} \right) + v \left( \alpha_i - \beta_i \frac{u^T v}{\|v\|^2} \right) \right].$$

10. A non-transitory computer-readable medium including instructions that, when executed by a computing device, cause the computing device to graphically simulate surface dynamics of a target object by performing the steps of:
generating triangle information representative of a triangle within a simulation mesh of a surface of the target object that is being graphically simulated within a computing device, wherein the surface comprises a fabric surface, wherein the triangle information includes at least position data for each vertex associated with the triangle; and
generating, using position-based dynamics and without using force-based time integration simulation, a graphical simulation of dynamics of the surface of the target object by operation of one or more computer processors of the computing device when executing the instructions, and by projecting, for each triangle within the simulation mesh, a set of continuum-based constraints determined based on weft and warp vector magnitudes of the respective triangle, the set of continuum-based constraints including a shear constraint a weft constraint, and a warp constraint, wherein the weft constraint is determined based on the weft vector magnitude, wherein the warp constraint is determined based on the warp vector magnitude, wherein the shear constraint is determined based on the weft and warp vector magnitudes and implements non-rigid stiffness in order to facilitate realism in simulated fabric dynamics while avoiding locking in the simulation mesh and without requiring non-rigid distance constraints, thereby avoiding stretch artifacts resulting from applying non-rigid distance constraints, wherein the graphical simulation includes deformation of the surface over time, wherein deformation of the surface over time comprises movement of particles of the surface of the soft object over time, wherein the particles are defined by vertices of the mesh, wherein the graphical simulation is adapted for visual output.

11. The non-transitory computer-readable medium of claim 10, wherein the shear constraint comprises a quotient between a dot product of a weft vector and a warp vector and a scalar product of a magnitude for the weft vector and the magnitude for the warp vector.

12. The non-transitory computer-readable medium of claim 11, wherein the weft constraint comprises a first difference between the magnitude for the weft vector and one.

13. The non-transitory computer-readable medium of claim 11, wherein the weft vector comprises a first vector sum of a first scalar-vector product between a first scalar and a first vertex, a second scalar-vector product between a second scalar and a second vertex, and a third scalar-vector product between a third scalar and a third vertex.

14. The non-transitory computer-readable medium of claim 13, wherein the warp constraint comprises a second difference between the magnitude for the warp vector and one.

15. The non-transitory computer-readable medium of claim 14, wherein the warp vector comprises a second vector sum of a fourth scalar-vector product between a fourth scalar and the first vertex, a fifth scalar-vector product between a fifth scalar and the second vertex, and a sixth scalar-vector product between a sixth scalar and the third vertex.

16. The non-transitory computer-readable medium of claim 10, wherein a shear gradient is associated with the shear constraint, a weft gradient is associated with the weft constraint, and a warp gradient is associated with the warp constraint.

17. The non-transitory computer-readable medium of claim 16, wherein projecting comprises computing a displacement vector for each vertex of the triangle, based on the weft constraint, the weft gradient, the warp constraint, the warp gradient, the shear constraint, and the shear gradient, wherein each displacement vector is scaled based on a mass associated with a corresponding vertex.

18. A system to graphically simulate surface dynamics of a target object, the system comprising:
one or more computer processors; and
a memory containing a program which, when executed by the one or more computer processors, performs an operation comprising:
generating triangle information representative of a triangle within a simulation mesh of a surface of the target object that is being graphically simulated within a computing device, wherein the surface comprises a fabric surface, wherein the triangle information includes at least position data for each vertex associated with the triangle; and
generating, using position-based dynamics and without using force-based time integration simulation, a graphical simulation of dynamics of the surface of the target object by operation of one or more computer processors and by projecting, for each triangle within the simulation mesh, a set of continuum-based constraints determined based on weft and warp vector magnitudes of the respective triangle, the set of continuum-based constraints including a shear constraint a weft constraint, and a warp constraint, wherein the weft constraint is determined based on the weft vector magnitude, wherein the warp constraint is determined based on the warp vector magnitude, wherein the shear constraint is determined based on the weft and warp vector magnitudes and implements non-rigid stiffness in order to facilitate realism in simulated fabric dynamics while avoiding locking in the simulation mesh and without requiring non-rigid distance constraints, thereby avoiding stretch artifacts resulting from applying non-rigid distance constraints, wherein the graphical simulation includes deformation of the surface over time, wherein deformation of the surface over time comprises movement of particles of the surface of the soft object over time, wherein the particles are defined by vertices of the mesh, wherein the graphical simulation is output.

19. The system of claim 18, wherein the shear constraint comprises a quotient between a dot product of a weft vector and a warp vector and a scalar product of a magnitude for the weft vector and a magnitude for the warp vector.

20. The system of claim 18, wherein a shear gradient is associated with the shear constraint, a weft gradient is associated with the weft constraint, and a warp gradient is associated with the warp constraint.

* * * * *